(12) United States Patent
Breed

(10) Patent No.: US 9,053,633 B2
(45) Date of Patent: Jun. 9, 2015

(54) UNIVERSAL TOLLING SYSTEM AND METHOD

(75) Inventor: David S. Breed, Miami Beach, FL (US)

(73) Assignee: Intelligent Technologies International, Inc., Miami Beach, FL (US)

(*) Notice: Subject to any disclaimer, the term of this patent is extended or adjusted under 35 U.S.C. 154(b) by 66 days.

(21) Appl. No.: 13/603,127

(22) Filed: Sep. 4, 2012

(65) Prior Publication Data

US 2013/0010116 A1 Jan. 10, 2013

(51) Int. Cl.
*G08G 1/017* (2006.01)
*B60W 30/16* (2012.01)
*G08G 1/127* (2006.01)

(52) U.S. Cl.
CPC ............. *G08G 1/0175* (2013.01); *B60W 30/16* (2013.01); *G08G 1/127* (2013.01)

(58) Field of Classification Search
CPC .... B60R 1/00; B60R 2300/105; B60R 11/04; B60R 2300/802; H04N 7/181
See application file for complete search history.

(56) References Cited

U.S. PATENT DOCUMENTS

| | | | |
|---|---|---|---|
| 3,548,212 A | 12/1970 | Whetter | |
| 5,101,200 A * | 3/1992 | Swett | 340/937 |
| 5,270,780 A | 12/1993 | Moran | |
| 5,408,541 A | 4/1995 | Sewell | |
| 5,490,079 A * | 2/1996 | Sharpe et al. | 705/418 |
| 5,581,630 A * | 12/1996 | Bonneau, Jr. | 382/116 |
| 5,627,511 A | 5/1997 | Takagi | |
| 5,694,322 A | 12/1997 | Westerlage et al. | |
| 5,717,389 A | 2/1998 | Mertens et al. | |
| 5,732,074 A * | 3/1998 | Spaur et al. | 370/313 |
| 5,805,082 A * | 9/1998 | Hassett | 340/928 |
| 5,864,831 A | 1/1999 | Schuessler | |
| 6,088,680 A | 7/2000 | Hoshino et al. | |
| 6,140,941 A * | 10/2000 | Dwyer et al. | 340/928 |
| 6,653,946 B1 | 11/2003 | Hassett | |
| 6,684,155 B1 | 1/2004 | Chen et al. | |
| 6,816,707 B1 | 11/2004 | Barker et al. | |
| 6,937,162 B2 | 8/2005 | Tokitsu et al. | |
| 6,959,282 B2 | 10/2005 | Kakihara et al. | |
| 7,106,212 B2 | 9/2006 | Konishi et al. | |

(Continued)

FOREIGN PATENT DOCUMENTS

JP    09-318749 A    12/1997
WO    9701111 A2     1/1997

OTHER PUBLICATIONS

Governments Look for New Ways to Pay for Roads and Bridges, John Schwartz, Feb. 14, 2013, The New York Times.

(Continued)

*Primary Examiner* — Dave Czekaj
*Assistant Examiner* — Nam Pham
(74) *Attorney, Agent, or Firm* — Brian Roffe

(57) ABSTRACT

System and method for tolling includes a location determining system arranged in a vehicle to determine its location during vehicular travel, a memory device that stores data about predetermined locations, and a processor coupled to the location determining system and that compares the location of the location determining system to data in the memory device to determine whether a transmission of the location is necessary and if so, directs the transmission to a remote site via the Internet. The memory device and/or processor may also be arranged on the vehicle, i.e., to provide a completely vehicle-resident system that may be installed on the vehicle during manufacture or retrofit to the vehicle.

20 Claims, 3 Drawing Sheets

(56) References Cited

U.S. PATENT DOCUMENTS

| | | |
|---|---|---|
| 7,127,413 B1 | 10/2006 | Yanagisawa et al. |
| 7,539,500 B2 | 5/2009 | Chiang |
| 7,835,753 B2 | 11/2010 | Alfert et al. |
| 7,999,697 B2 | 8/2011 | Jia et al. |
| 8,138,949 B2 | 3/2012 | Tsuzuki et al. |
| 8,219,443 B2 | 7/2012 | Delia et al. |
| 8,245,921 B2 | 8/2012 | Sol |
| 8,265,988 B2 | 9/2012 | Hedley et al. |
| 8,280,791 B2 | 10/2012 | Davis, III et al. |
| 8,344,886 B2 | 1/2013 | Gravelle et al. |
| 8,346,598 B2 | 1/2013 | Hafenscher et al. |
| 8,374,911 B2 | 2/2013 | Glachant et al. |
| 8,634,804 B2 | 1/2014 | McNamara et al. |
| 2005/0071175 A1* | 3/2005 | Gila et al. ............ 705/1 |
| 2005/0097018 A1 | 5/2005 | Takida |
| 2006/0200379 A1 | 9/2006 | Biet |
| 2009/0024458 A1 | 1/2009 | Palmer |
| 2010/0076878 A1 | 3/2010 | Burr |
| 2010/0287038 A1 | 11/2010 | Copejans |
| 2012/0215594 A1 | 8/2012 | Gravelle |
| 2013/0006723 A1 | 1/2013 | McGowan |
| 2013/0006724 A1 | 1/2013 | Simanek |
| 2013/0006725 A1 | 1/2013 | Simanek |
| 2014/0025444 A1 | 1/2014 | Willis |
| 2014/0278838 A1 | 9/2014 | Novak |

OTHER PUBLICATIONS

SMART Options Paper, Context and Considerations of a Mileage Fee for Michigan, Prepared by SMART—Sustainable Mobility & Accessibility Research & Transformation at the University of Michigan for the Michigan Environmental Council, Apr. 2014, Elizabeth Treutel and Alexandro Bazan.

Tollway test zone may pave way for smartphones to pay tolls, Richard Wronski, Chicago Tribune, Jul. 16, 2014.

P.S. Pencikowski, A Low Cost Vehicle-Mounted Enhanced Vision System Comprised of a Laser Illuminator and Range-Gated Camera, in Enhanced and Synthetic Vision 1996 222 (Jacques G. Verly ed.).

H.R. Everett, Survey of Collision Avoidance and Ranging Sensors for Mobile Robots, 5 Robotics and Autonomous Systems 5 (1989).

* cited by examiner

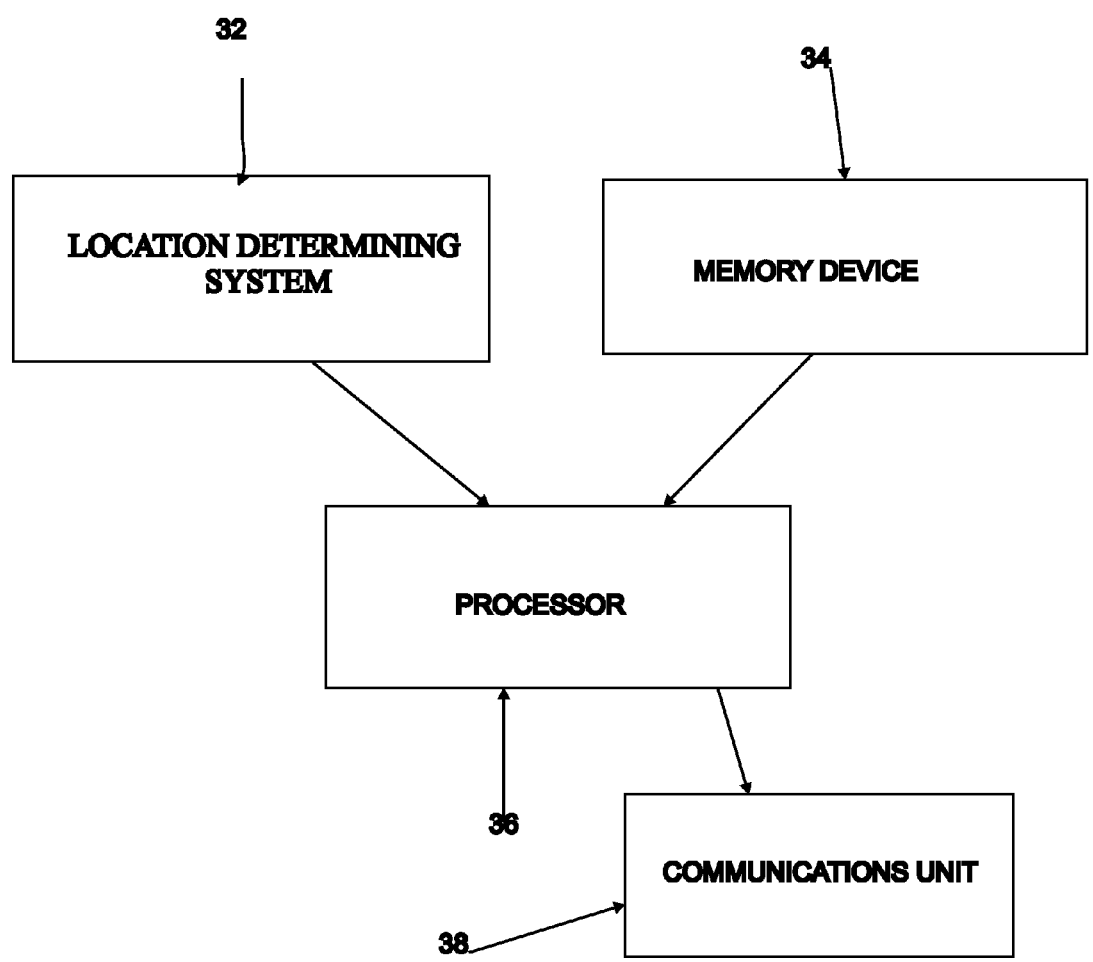

UNIVERSAL TOLLING SYSTEM AND METHOD

CROSS-REFERENCE TO RELATED APPLICATIONS

This application is related to U.S. patent application Ser. No. 09/177,041 filed Oct. 22, 1998, now U.S. Pat. No. 6,370,475, Ser. No. 09/523,559 filed Mar. 10, 2000, now abandoned, Ser. No. 09/679,317 filed Oct. 4, 2000, now U.S. Pat. No. 6,405,132, Ser. No. 09/909,466 filed Jul. 19, 2001, now U.S. Pat. No. 6,526,352, Ser. No. 10/118,858 filed Apr. 9, 2002, now U.S. Pat. No. 6,720,920, Ser. No. 10/216,633 filed Aug. 9, 2002, now U.S. Pat. No. 6,768,944, Ser. No. 10/822,445 filed Apr. 12, 2004, now U.S. Pat. No. 7,085,637, Ser. No. 11/028,386 filed Jan. 3, 2005, now U.S. Pat. No. 7,110,880, Ser. No. 11/034,325 filed Jan. 12, 2005, now U.S. Pat. No. 7,202,776, Ser. No. 11/421,500, now U.S. Pat. No. 7,672,756, Ser. No. 11/461,619 filed Aug. 1, 2006, now U.S. Pat. No. 7,418,346, Ser No. 11/464,385 filed Aug. 14, 2006, now U.S. Pat. No. 7,629,899, Ser. No. 11/562,730 filed Nov. 22, 2006, now U.S. Pat. No. 7,295,925, Ser. No. 11/681,817 filed Mar. 5, 2007, now U.S. Pat. No. 7,426,437, Ser. No. 11/778,127 filed Jul. 16, 2007, now U.S. Pat. No. 7,912,645, Ser. No. 11/874,418 filed Oct. 18, 2007, now U.S. Pat. No. 7,610,146, Ser. No. 11/874,732 filed Oct. 18, 2007, now U.S. Pat. No. 7,791,503, Ser. No. 11/874,749 filed Oct. 18, 2007, now U.S. Pat. No. 8,255,144, and Ser. No. 12/061,943 filed Apr. 3, 2008, now U.S. Pat. No. 8,260,537, and U.S. provisional patent application Ser. No. 60/062,729 filed Oct. 22, 1997, now expired, Ser. No. 60/123,882 filed Mar. 11, 1999, now expired, and 60/711,452 filed Aug. 25, 2005, now expired, on the grounds that they include common subject matter.

All of the above applications are incorporated by reference herein.

FIELD OF THE INVENTION

The present invention relates generally to systems and methods for universal tolling for the use of publicly owned infrastructure such as roads, highways, bridges and tunnels.

BACKGROUND OF THE INVENTION

Vehicle owners or users are frequently assessed a fee for the use of commonly or publicly owned infrastructure such as toll roads, bridges and tunnels. Such fees are typically referred to as tolls. The public is required to fund the development and maintenance of such infrastructure primarily through the use of various taxes including in particular a tax on fuel. Significant inequities however occur because such taxes as the fuel tax are not paid by infrastructure users in proportion to their use of the infrastructure. For example, vehicles which have a greater fuel economy pay less and electric vehicles pay nothing. Tolls which are collected at particular locations along a highway or at the entrance of a tunnel additionally only crudely tax vehicles in proportion to their use. Such tax collection and tolling systems are additionally expensive to implement and can contribute to congestion on the nation's roadways as vehicles queue waiting to pay the toll. Because of these inequities and inefficiencies, there is a need for a ubiquitous and fair infrastructure charging system to eliminate the drawbacks of the current system.

A detailed discussion of additional background information is set forth in applications referenced above, for example, U.S. patent application Ser. Nos. 09/679,317, 10/822,445, 11/028,386, 11/034,325, 11/421,500 and 12/061,943 all of which are incorporated by reference herein.

All of the patents, patent applications, technical papers and other references mentioned below and in the applications referenced above are incorporated by reference herein in their entirety. No admission is made that any or all of these references are prior art and indeed, it is contemplated that they may not be available as prior art when interpreting 35 U.S.C. §102 in consideration of the claims of the present application.

Definitions of terms used in the specification and claims are also found in the applications referenced above.

OBJECTS AND SUMMARY OF THE INVENTION

It is an object of the present invention to provide systems and methods for universal tolling for use of publicly owned infrastructure through the use of automatic communication to the Internet for the purpose of recording the use of such infrastructure and charging therefor.

In order to achieve this object and possibly others, a system and method is provided whereby vehicles in particular and individuals are recorded as having used an item of infrastructure for which a toll is to be levied.

A system for tolling in accordance with the invention includes a location determining system arranged in a vehicle to determine its location during vehicular travel, a memory device that stores data about predetermined locations, and a processor coupled to the location determining system and that compares the location of the location determining system to data in the memory device to determine whether a transmission of the location is necessary and if so, to direct the transmission to a remote site via the Internet. The memory device and/or processor may also be arranged on the vehicle, i.e., to provide a completely vehicle-resident system that may be installed on the vehicle during manufacture or retrofit to the vehicle.

A communications device may also be arranged on the vehicle and coupled to the processor and that is directed by the processor to send a transmission to the remote site. The communications device may be configured to send an identification of the vehicle to the remote site, and/or an identification of a smartphone present in the vehicle or whose owner is present in or driving the vehicle. The communications device may be configured to use a cellphone system when transmitting to the remote site and/or a direct Internet service provider when transmitting to the remote site.

Imaging devices may be arranged along roadways and in positions to monitor passage of vehicles by the predetermined locations. The imaging devices may comprise receivers configured to intercept transmissions from the vehicle to the remote site such that if a vehicle passes a predetermined location and does not transmit an identification, the imaging devices obtains an image of the vehicle for the purpose of an alternate toll charging method or to ascertain that the vehicle is attempting to avoid the toll. The imaging devices may additionally or alternatively be configured to process images to determine the presence of a towed trailer, whereby when multiple transmissions are not detected from the towed trailer, the imaging device obtains an image of a license plate of the towed trailer.

The predetermined locations in the memory device would typically relate to locations that require payment for use of infrastructure, such as a toll road, tunnel, bridge, parking lot, etc. The processor may be coupled to a smartphone of a driver of the vehicle whose identification is included in the transmission such that payment for use of the infrastructure indicated by the transmissions is charged to the smartphone owner.

A method for tolling in accordance with the invention includes arranging a location determining system in a vehicle to determine its location during vehicular travel, comparing the location of the location determining system to data in a memory device to determine whether a transmission of the location is necessary, and if so, directing the transmission to a remote site via the Internet. Variations of the method include determining, at the remote site, distance that the vehicle has traveled since a previous transmission, or its use of a fee-required infrastructure, and calculating a toll based on the distance traveled or infrastructure use. An identification of the vehicle is sent to the remote site in or with the transmission. The toll may be calculated depending on the vehicle identification, and varied based on time of day, type of vehicle or value of a highway traveled or other infrastructure used. An identification of a smartphone present in the vehicle or owned by a driver or occupant of the vehicle may be transmitted to the remote site in or with the transmission to enable the smartphone owner to be charged for use of infrastructure instead of the vehicle owner.

Other improvements will now be obvious to those skilled in the art. The above features are meant to be illustrative and not definitive.

BRIEF DESCRIPTION OF THE DRAWINGS

The following drawings are illustrative of embodiments of the system developed or adapted using the teachings of at least one of the inventions disclosed herein and are not meant to limit the scope of the invention as encompassed by the claims.

FIG. 3 is a schematic of an automatic vehicle-based tolling system.

DETAILED DISCUSSION OF PREFERRED EMBODIMENTS

Figure 1:
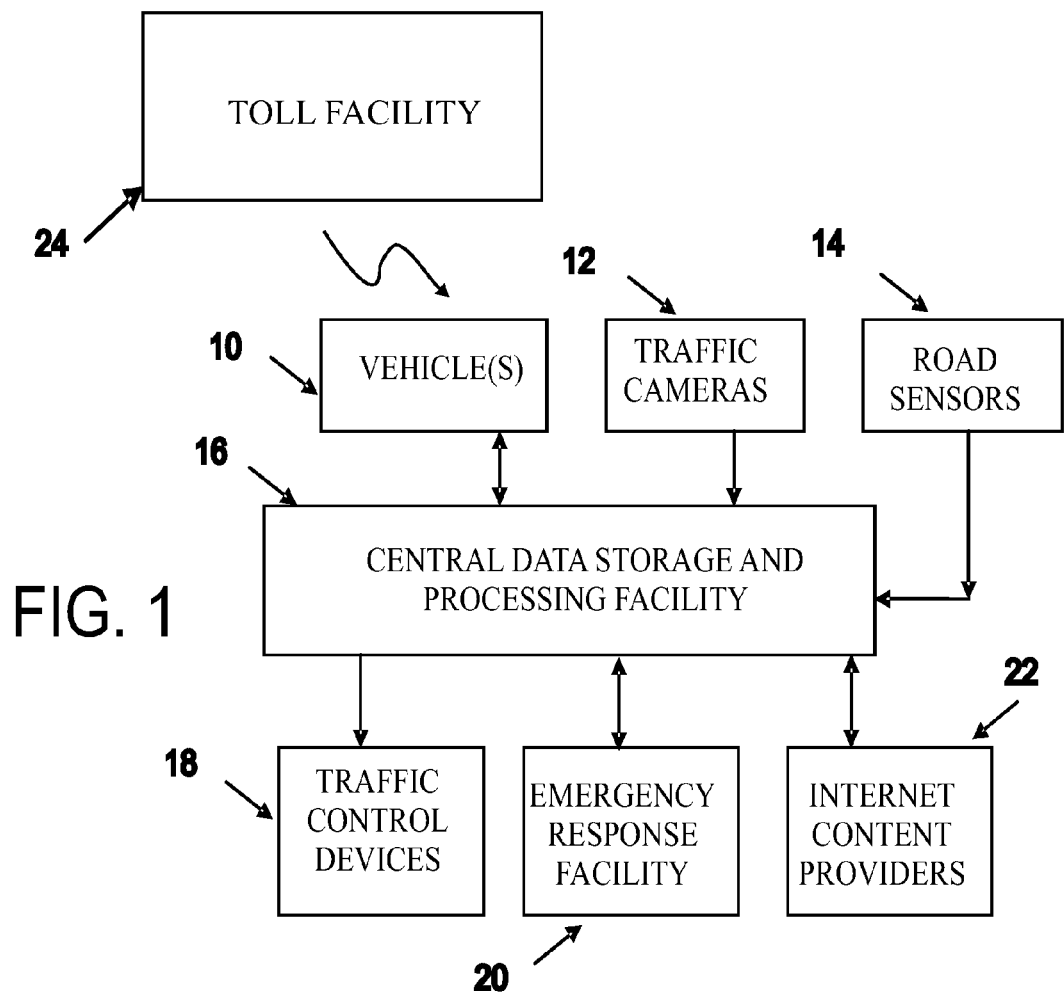
FIG. 1 is a schematic of a ubiquitous communication system in accordance with the invention.

FIG. 1 shows a schematic of the flow of data to and from vehicles in accordance with the invention. Information to be wirelessly transmitted, preferably via a ubiquitous network, to an information receiving system resident on the "host" vehicle 10 during travel of the vehicle 10 is generated by one or more information sources which include "probe" vehicles 10, traffic cameras 12 and road sensors 14. The probe vehicles 10 provide information about one or more roads on which the host vehicle will travel or is expected to travel at some time in the future, the difference being if the road the vehicle expects to travel on is congested, the driver of the host vehicle can take an alternative route. Other sources of information include data channels with weather information, i.e., meteorological reports, and traffic information such as that provided by highway, bridge and tunnel operators and municipalities. It is important to note that the host vehicle can also be a probe vehicle, in that information it obtains can be used for transmission to vehicles behind it on the same path, and that a probe vehicle can be a host vehicle in that information it receives was obtained by vehicle in front of it on the same path. As such, FIG. 1 shows element 10 designated as vehicles.

This information is sent from the various sources, preferably over a ubiquitous network, and is gathered in a central data storage, monitoring and/or processing facility 16, e.g., a network server or mainframe computer, which may entail directing the information sources to respond to inquiries for information from the data facility or programming the information sources to automatically provide the information at set times. The probe vehicles 10 can also continually provide information limited only by the components of the transmission unit thereon. The data facility 16 can also be programmed to automatically access data channels on a regular basis to obtain current information about roads and weather. Although the data facility 16 gathers a large amount of information, not all of the information will be directed to the vehicle 10, i.e., only potential relevant information will be considered for each vehicle 10 in communication with the data facility 16. Thus, different subsets of the total available information will be generated for each host vehicle 10.

The data facility 16 includes software and hardware components which enables it to prioritize the information to distinguish between high priority, time-critical information of immediate relevance to operation of the host vehicle 10 and low priority, non-time-critical information of non-immediate relevance to the operation of the host vehicle 10. It can thus be programmed to control and communicate with the information receiving system to cause it to receive and process high priority information before low priority information, the transmission of both of which are directed by the data facility 16. Prioritization can be established based on the current position of the host vehicle 10.

Data facility 16 can be programmed to maintain a map of roads resident in host vehicles by transmitting map updates necessary for the maps to be current, the map updates being generated based on the gathered information. If a temporary map update is created based on a change in the operability or functionality of a road, e.g., based on a traffic accident, the data facility 16 is programmed to continuously monitor the change to determine when the use of the road reverts to a state preceding the change. When this happens, notification of this reversion is transmitted to the host vehicle, e.g., via another map update.

Data facility 16 communicates with traffic control devices 18 via the ubiquitous network of transceivers. It can thus analyze vehicular traffic and control the traffic control devices based on the vehicular traffic, e.g., regulate the pattern of green lights to optimize traffic, eliminate traffic jams and expedite emergency response vehicles.

Data facility 16 also communicates with an emergency response facility 20 to direct aid to a host vehicle when necessary or to the site of an accident as determined by the information gathered from the sources thereof.

Data facility 16 also communications with Internet content providers 22 to allow the occupants of host vehicles to request Internet content over the ubiquitous network.

It should be understood that the transmission of information between vehicles is one exemplifying use of the invention which also encompasses generating information from other types of mobile units, transmitting the information to a common monitoring station, generating at the monitoring station an update for, e.g., a map, based on the transmitted information, and then transmitting the update to each of the mobile units.

Universal Tolling

As an example of another type of information that may be transmitted, FIG. 1 also shows a toll facility 24 that is incorporated into a method and system for universal tolling in accordance with the invention.

The Internet is rapidly becoming ubiquitous. At present there is limited direct access to Internet service providers (ISP) along the nation's highways. Nevertheless, Internet access is generally available through the cell phone system, although at a charge to the smartphone user. This situation is gradually changing to where in the future it is expected that there will be direct ISP access anywhere in the continental United States. The inventions disclosed herein can be a significant contributor to such ubiquitous Internet implementation. Although the focus of these inventions is to significantly simplify and increase the fairness of such tolls for vehicles, the concepts can be readily adapted to other situations where the owner of a device such as a smartphone can automatically pay for admission into a theater, for example, or pay another toll equivalent charge.

Today, many vehicles have been retrofitted with a RFID tag which permits the rapid transit of such equipped vehicles through various tolling stations. Examples are E-ZPass and SunPass. When the vehicle passes an interrogator location, the vehicle located tag transmits a code or ID to the interrogator which then debits the account of the tag owner. The majority of the cost of building and maintaining even such interrogator equipped toll roads is still at least in part covered by fuel tax receipts.

Figure 2:
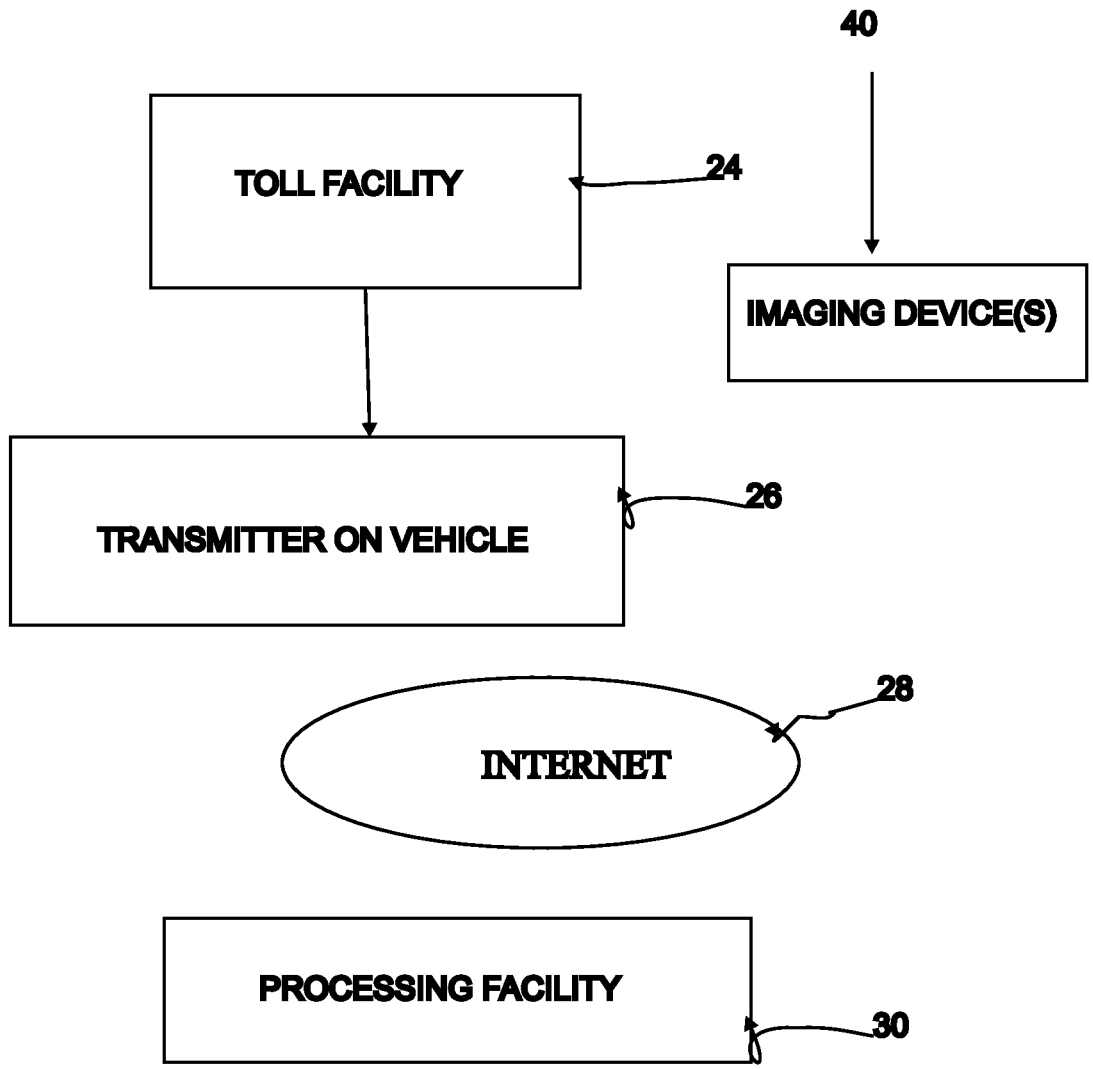
FIG. 2 is a schematic showing one manner in which an indication of payment for a toll from a vehicle is generated.

Referring to FIG. 2, a technique in accordance with the invention replaces the RFID interrogator with an Internet-connected transmitter 26 which when triggered either by an infrastructure signal from the toll facility 24, the passing of a GPS determined location, or time passage, sends a message containing an identification to a remote site 30 via the Internet 28. This can be accomplished either through the cell phone system or through a direct connection with an ISP. Except in the case where an infrastructure-based trigger is provided, the implementation of this system does not require any infrastructure investment other than enforcement camera systems.

To illustrate one implementation of this invention with reference to FIG. 3, a vehicle has a device 32 which monitors its location based on a GPS receiver. The vehicle knows where it is at all times. When the vehicle passes a particular geographic location, which may be determined by a processor 36 comparing the current location to locations stored in a memory device 34, it automatically transmits its location to a remote site via the Internet, e.g., via the processor 36 directing a communications unit 38. The memory device 34, which represents one or more memory components or data storage devices, may be arranged entirely on the vehicle, only partly on the vehicle and partly at one or more remote, off-vehicle locations or entirely off-vehicle. For example, the memory device 34 may be in the "cloud" thereby saving storage on the vehicle.

The software at the remote site, not shown, determines the distance that the vehicle has traveled on the highway since its previous transmission, or its use of another particular infrastructure, and calculates a toll based on that distance traveled or infrastructure use. When the vehicle has completed its trip, or at some other convenient time, software at the remote site calculates a toll based on the usage by the vehicle of the highway or other infrastructure. The charging rate can depend on the vehicle ID, the time of the day and/or the value of the highway or other infrastructure. A large truck, for example, will be charged more than a passenger car which also will be charged more than a motorcycle. Vehicles traveling during rush hour can be charged more than vehicles traveling during times when the highway is less used. Vehicles traveling on highways located over rivers or in downtown cities will be charged more than vehicles traveling on rural roads.

The implementation of the device in the vehicle can take many forms. New vehicles, for example, can come equipped with a minimal system comprising a GPS receiver and Internet communication system. Various predetermined geographic locations can be identified, and stored in memory device 34, such that when the vehicle passes such a location, it will transmit its ID to the Internet using the communications unit 38. The receiving location or remote site will monitor the positions of the vehicle over time and when transmissions cease, indicating the end of a trip, it will calculate a toll and deduct the amount from the account of the vehicle owner.

Imaging devices such as cameras 40 can be installed periodically on and/or along the roadway to monitor the passage of vehicles by the predetermined geographic locations (see FIG. 2). Such cameras 40 can also contain receivers which can intercept the vehicle to remote site transmissions. If a vehicle passes such a predetermined geographic location and does not transmit a vehicular identification to the Internet, the camera 40 can photograph the vehicle for the purpose of an alternate toll charging method or to ascertain that the vehicle is attempting to avoid the toll.

In the case of existing vehicles, the system (of the location determining system, memory device and processor as a single, integrated unit or otherwise) can be retrofitted onto the vehicle in much the same manner as RFID tags are retrofitted now. For example, vehicles currently using RFID transponders can be required to affect the substitution. Vehicles which do not implement the retrofit system can be tolled using license plate recognition cameras as is now done in some locations. The tolling rate for such vehicles can be higher to incentivize the implementation of the retrofit system. There will of course be the requirement that all vehicles maintain a camera-readable license plate as is already a requirement in some states. Those license plates that violate this requirement can be identified through cameras and the proper authorities immediately alerted.

Once this system is completely implemented, all current tolling stations can be eliminated. This will substantially reduce the cost of tolling in that toll collectors and tolling booths will no longer be necessary. It will also facilitate the elimination of the gasoline tax and thus the immediate reduction in the cost of gasoline. Since the vehicle-resident transmitter will know the nature of the vehicle, trucks can be preferentially tolled over cars and cars over motorcycles. Vehicles pulling trailers can be charged for the vehicle and the trailer. Trailers now are required to have valid license plates so it would not be unreasonable to require such trailers to also have retrofitted systems which only transmit their ID. In this case, infrastructure mounted cameras can process images using, for example, pattern recognition software either associated with the camera or at a remote site to determine the presence of a towed trailer and if two signals are not transmitted, the trailer license plate can be recorded.

If the driver of such a vehicle possesses a smartphone, the driver can effectuate the coupling of the smartphone with the vehicle resident system, or this coupling may be detected automatically. In this case, the toll can be charged to the smartphone owner rather than to the vehicle owner, i.e., the presence or coupling of the smartphone in the vehicle will override the default use of the vehicular identification in the transmissions so that the smartphone identification will be included in the transmissions. However, both the vehicle's ID as well as the smartphone owner's ID will be recorded as part of the transaction, to evidence use of the vehicle by the smartphone owner.

Various enhancements can be effectuated using smartphone applications such as determining in advance the cost of a trip when the smartphone operator enters his destination, assuming the trip from the current location to the destination. Various alternatives can also be presented such as what that cost would be if the owner chose a different route or time of day. These additional features can of course also be implemented in new vehicle systems as well as retrofitted systems. They can be displayed on the smartphone display or otherwise notified to the smartphone owner.

The smartphone can therefore include applications that calculate tolling charge and offer route alternatives, alert the owner of the smartphone operating or present in the vehicle of charges for use of the infrastructure, whether from the remote site or from vehicle owner, and that connect directly to the Internet for tolling purposes.

Initially, the current RFID tag system will need to operate in parallel with the new system. Thus, vehicles can pass the RFID interrogator locations freely as long as there is a connection between the Internet and the transponder. In this case, the RFID tag interrogator will ignore the vehicle. For early adopters, the tolls charged to the vehicle or smartphone owner can be reduced by an amount appropriate to eliminate the effect of the gasoline tax and by an additional amount to incentivize adoption. Shortly thereafter, it is expected that the gasoline tax will be removed and all other tolls increased proportionately. This may result in a windfall for those not traveling on tolled infrastructure until the entire system has been implemented.

An alternative version of the system can require that the odometer readings of the equipped vehicles also be transmitted thereby minimizing the number of predetermined geographic locations where tolling is implemented and where cameras are required. Thus, whenever a vehicle passes a predetermined geographic location, the miles traveled by the vehicle can be recorded and the change in miles traveled from the last transmission can be used to determine the required toll. In such cases, it can be assumed that the tolls would be based on the non-congestion time of day rate. Alternatively, a transmission can be programmed to occur whenever the odometer records a change of a predetermined incremental mileage such as 100 miles. This incremental mileage determination can alternatively be calculated using GPS readings.

Naturally, there will be many attempts to game the system and it will take time to eliminate all of the anomalies and ultimately result in a fair and balanced tolling system that generates sufficient revenues to maintain the existing infrastructure and create required new infrastructure. Since the tolls will be based on the replacement value of the infrastructure, the users will become sensitized to the cost of such replacement and will be motivated to become involved in determining what infrastructure is constructed and by whom. Since the use of union labor, for example, will increase the cost of such infrastructure construction, users will be motivated to insist that the government allocate contracts to the lowest bidders regardless of union labor use.

In a preferred implementation of the system, a display will be provided in the vehicle or on a smartphone which will provide the current rate being charged as well as the total charges so far on a particular trip. In this manner, the vehicle driver will not be surprised when the bill later arrives. Additionally, the system can alter the tolls for different paths to cause users to change their path to an alternate in order to relieve congestion.

The particular communication protocol used by the system to communicate with the Internet can be any text-based system such as SMS or equivalent.

Since the system will be aware of the physical location of every vehicle, the location of a stolen vehicle can be readily determinable thus inhibiting such thefts. Also since the vehicle location will be determinable, programs can be implemented which will notify interested parties when a particular vehicle travels outside of a chosen geographical area, also known as geo-fencing. Thus parents can keep better track of their teenagers and trucking companies of their cargo.

The system described above when implemented on a smartphone can also be used for other "tolling" situations such as payment for parking, entrance to museums, theaters, sports arenas, or other secured places.

While the invention has been illustrated and described in the drawings and the foregoing description, the same is to be considered as illustrative and not restrictive in character, it being understood that only preferred embodiments have been shown and described and that all changes and modifications that come within the spirit of the invention are desired to be protected.

This application is one in a series of applications covering safety and other systems for vehicles and other uses. The disclosure herein goes beyond that needed to support the claims of the particular invention that is claimed herein. This is not to be construed that the inventors are thereby releasing the unclaimed disclosure and subject matter into the public domain. Rather, it is intended that patent applications have been or will be filed to cover all of the subject matter disclosed above.

Preferred embodiments of the inventions are shown in the drawings and described in the detailed description below. Unless specifically noted, it is applicant's intention that the words and phrases in the specification and claims be given the ordinary and accustomed meaning to those of ordinary skill in the applicable art(s). If applicant intends any other meaning, he will specifically state he is applying a special meaning to a word or phrase. In this regard, the words velocity and acceleration will be taken to be vectors unless stated otherwise. Speed, on the other hand, will be treated as a scalar. Thus, velocity will imply both speed and direction.

Likewise, applicant's use of the word "function" in the detailed description is not intended to indicate that he seeks to invoke the special provisions of 35 U.S.C. §112, ¶6 to define his inventions. To the contrary, if applicant wishes to invoke the provision of 35 U.S.C. §112, ¶6, to define his inventions, he will specifically set forth in the claims the phrases "means for" or "step for" and a function, without also reciting in that phrase any structure, material or act in support of the function. Moreover, even if applicant invokes the provisions of 35 U.S.C. §112, ¶6, to define his inventions, it is applicant's intention that his inventions not be limited to the specific structure, material or acts that are described in preferred embodiments. Rather, if applicant claims his inventions by specifically invoking the provisions of 35 U.S.C. §112, ¶6, it is nonetheless his intention to cover and include any and all structures, materials or acts that perform the claimed function, along with any and all known or later developed equivalent structures, materials or acts for performing the claimed function.

For example, the present inventions make use of GPS satellite location technology to derive vehicle location. The inventions described herein are not to be limited to the specific GPS devices disclosed in preferred embodiments, but rather, are intended to be used with any and all such applicable satellite and infrastructure location devices, systems and methods, as long as such devices, systems and methods generate input signals that can be analyzed by a computer to accurately quantify vehicle location in real time. Thus, the GPS devices and methods shown and referenced generally throughout this disclosure, unless specifically noted, are intended to represent any and all devices appropriate to determine such location parameters.

Further, there are disclosed several processors or controllers, that perform various control operations. The specific form of processor is not important to the invention. In its preferred form, the computing and analysis operations can be divided into several cooperating computers or microprocessors. However, with appropriate programming well known to those of ordinary skill in the art, the inventions can be implemented using a single computer. Thus, it is not applicant's intention to limit his invention to any particular form or location of processor or computer. For example, it is contemplated that in some cases, the processor may reside in a smartphone or on a network connected to the vehicle such as one connected to the Internet.

Further examples exist throughout the disclosure, and it is not applicant's intention to exclude from the scope of his inventions the use of structures, materials, or acts that are not expressly identified in the specification, but nonetheless are capable of performing a claimed function.

The invention claimed is:

1. A system for tolling, comprising:
   a location determining system arranged in a vehicle to determine its location at a plurality of different times during vehicular travel such that multiple locations are provided by said location determining system;
   a memory device that stores data about predetermined toll locations;
   a communications device arranged on the vehicle; and
   a processor coupled to said location determining system and that analyzes each of the determined locations of said location determining system relative to the data in said memory device about predetermined toll locations,
   said processor being coupled to said communications device and configured to, based on the analysis of each of the determined locations of said location determining system relative to the data in said memory device about predetermined toll locations by said processor, direct a transmission of the determined location of said location determining system by said communications device to a remote site separate and apart from the vehicle when the determined location of said location determining system coincides with one of the predetermined toll locations,
   whereby a toll is determined based on the determined location of said location determining system transmitted by said communications device to the remote site or based on two determined locations of said location determining system transmitted by said communications device to the remote site,
   wherein said communications device is a smartphone and is configured to send an identification of said communications device to the remote site with each transmission of the determined location of said location determining system such that payment of the determined toll is charged to the smartphone owner.

2. The system of claim 1, wherein said memory device is arranged on the vehicle.

3. The system of claim 1, wherein said processor is arranged on the vehicle.

4. The system of claim 1, wherein said communications device is configured to send the transmission of the determined location of said location determining system to the remote site via the Internet.

5. The system of claim 4, wherein said communications device is configured to use a direct Internet service provider when transmitting the determined location of said location determining system to the remote site.

6. The system of claim 1, wherein said communications device is configured to send an identification of the vehicle to the remote site in or with the transmission of the determined location of said location determining system.

7. The system of claim 1, wherein said communications device is configured to use a cellphone system when transmitting the determined location of said location determining system to the remote site.

8. The system of claim 1, further comprising imaging devices arranged along roadways and in positions to monitor passage of vehicles by the predetermined toll locations.

9. The system of claim 8, wherein said communications device is configured to send an identification of the vehicle to the remote site with the transmission of the determined location of said location determining system, said imaging devices comprising receivers configured to intercept transmissions from the communications device of the vehicle to the remote site and obtain an image of a vehicle that passes one of the predetermined toll locations and for which a transmission including the identification is not intercepted, for the purpose of an alternate toll charging method or to ascertain that the vehicle is attempting to avoid the toll.

10. The system of claim 8, wherein said imaging devices are configured to process images to determine the presence of a towed trailer, whereby when multiple transmissions are not detected from the towed trailer, said imaging device obtains an image of a license plate of the towed trailer.

11. The system of claim 1, wherein the predetermined toll locations relate to locations that require payment for use of infrastructure.

12. The system of claim 1, wherein said communications device is configured to use a direct Internet service provider when transmitting the determined location of said location determining system to the remote site.

13. A method for tolling, comprising:
    arranging a location determining system in a vehicle to determine its location at a plurality of different times during vehicular travel such that multiple locations are provided by the location determining system;
    comparing, using a processor, each of the determined locations of the location determining system to data about predetermined toll locations in a memory device;
    directing, based on the comparison of each of the determined locations of the location determining system to the data in the memory device about predetermined toll locations by the processor, a transmission of the determined location of the location determining system from a communications device on the vehicle to a remote site separate and apart from the vehicle when the determined location of the location determining system coincides with one of the predetermined toll locations, whereby a toll is determined based on the determined location of the location determining system transmitted by the communications device to the remote site or based on two determined locations of said location determining system transmitted by the communications device to the remote site; and
    sending an identification of a smartphone present in the vehicle or owned by a driver or occupant of the vehicle to the remote site in or with each transmission of the determined location of the location determining system such that the smartphone owner is charged for the determined toll.

14. The method of claim 13, further comprising:
    determining, at the remote site, distance that the vehicle has traveled since a previous transmission of the determined location of the location determining system, or its use of a fee-required infrastructure; and calculating a toll based on the distance traveled or infrastructure use.

15. The method of claim 14, further comprising sending an identification of the vehicle to the remote site in or with the transmission of the determined location of the location determining system.

16. The method of claim 15, wherein the step of calculating a toll based on the distance traveled or infrastructure use comprises varying the toll based on the vehicle identification.

17. The method of claim 14, wherein the step of calculating a toll based on the distance traveled or infrastructure use comprises varying the toll based on time of day, type of vehicle or value of a highway traveled or other infrastructure used.

18. The method of claim 13, further comprising:
determining, at the remote site, distance that the vehicle has traveled since a previous transmission of the determined location of the location determining system; and
varying the determined toll based on the distance traveled, time of day, type of vehicle or value of a highway traveled or other infrastructure used.

19. The method of claim 13, further comprising storing information about location of infrastructure that requires payment for use by vehicles in another memory device.

20. The method of claim 13, further comprising:
sending, via the Internet, an identification of the vehicle to the remote site in or with the transmission of the determined location of the location determining system;
monitoring passage of vehicles by the predetermined toll locations using imaging devices;
intercepting transmissions from the communications device of the vehicle to the remote site and when a vehicle passes a predetermined toll location and does not transmit an identification, photographing the vehicle for the purpose of an alternate toll charging method or to ascertain that the vehicle is attempting to avoid the toll; and
processing images from the imaging devices to determine the presence of a towed trailer, and when multiple transmissions are not detected from the towed trailer, obtaining an image of a license plate of the towed trailer.

* * * * *